(12) United States Patent
Imms

(10) Patent No.: US 11,054,915 B2
(45) Date of Patent: Jul. 6, 2021

(54) LOCALLY IMPLEMENTED TERMINAL LATENCY MITIGATION

(71) Applicant: Microsoft Technology Licensing, LLC, Redmond, WA (US)

(72) Inventor: Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/576,859

(22) Filed: Sep. 20, 2019

(65) Prior Publication Data
US 2021/0089138 A1  Mar. 25, 2021

(51) Int. Cl.
*G06F 3/023* (2006.01)
*G06F 13/10* (2006.01)

(52) U.S. Cl.
CPC .......... *G06F 3/0237* (2013.01); *G06F 13/107* (2013.01)

(58) Field of Classification Search
CPC combination set(s) only.
See application file for complete search history.

(56) References Cited

U.S. PATENT DOCUMENTS

| | | | |
|---|---|---|---|
| 5,430,840 A * | 7/1995 | Berg | G06F 3/0489 715/745 |
| 5,809,415 A * | 9/1998 | Rossmann | E21B 43/121 455/422.1 |
| 7,124,218 B2 | 10/2006 | Hartmann et al. | |
| 9,158,433 B1 | 10/2015 | Kosonovsky | |
| 2003/0061277 A1 | 3/2003 | Hartmann et al. | |
| 2010/0064061 A1 | 3/2010 | Warren et al. | |

OTHER PUBLICATIONS

"Chapter 4—Configuring Putty", retrieved from «https://web.archive.org/web/20190409154901/https:/www.ssh.com/ssh/putty/putty-manuals/0.68/Chapter4.html», Apr. 9, 2019, 54 Pages.

"Emulating a Remote Terminal", retrieved from «https://web.archive.org/web/20190212222929/http:/josh.com/tiny/lwp/dosutil2.htm», Feb. 12, 2019, 41 Pages.

(Continued)

*Primary Examiner* — Van N Chow
(74) *Attorney, Agent, or Firm* — Ogilvie Law Firm

(57) ABSTRACT

Terminal latency mitigation improves performance of networked consoles by embedding latency mitigation functionality in a terminal emulator. An enhanced terminal reduces perceived and actual delays by accurately predicting responses a remote service will provide to key press data. Latency mitigation may receive key press data, transmit it toward the remote service, locate a prediction, obtain a prediction string from the prediction, and write the prediction string to a display. A prediction indication may visually indicate the presence of a prediction string as opposed to an actual response from the remote service. After writing the prediction string, this terminal compares the response to the prediction string. When the prediction is accurate the terminal shows the prediction string without the prediction indication. When the prediction is inaccurate, the terminal replaces the prediction string by the response. The enhanced terminal may be server kernel independent, shell independent, and independent of proprietary communication protocols.

20 Claims, 7 Drawing Sheets

(56) References Cited

OTHER PUBLICATIONS

Winstein, et al., "Mosh: An Interactive Remote Shell for Mobile Clients", in USENIX Annual Technical Conference, Jun. 13, 2012, 6 Pages.
"Wingdings", retrieved from «https://en.wikipedia.org/wiki/Wingdings», Sep. 11, 2019, 7 pages.
"Kanji", retrieved from «https://en.wikipedia.org/wiki/Kanji», Aug. 21, 2019, 15 pages.
"Character (computing)", retrieved from «https://en.wikipedia.org/wiki/Character_(computing)», Sep. 13, 2019, 4 pages.
"Unicode", retrieved from «https://en.wikipedia.org/wiki/Unicode», Sep. 12, 2019, 34 pages.
"EBCDIC", retrieved from «https://en.wikipedia.org/wiki/EBCDIC», Aug. 21, 2019, 6 pages.
"ASCII", retrieved from «https://en.wikipedia.org/wiki/ASCII», Sep. 14, 2019, 19 pages.
"KVM switch", retrieved from «https://en.wikipedia.org/wiki/KVM_switch», Aug. 27, 2019, 11 pages.
"System console", retrieved from «https://en.wikipedia.org/wiki/System_console», Jun. 7, 2018, 2 pages.
"XTerm Control Sequences", retrieved from «https://invisible-island.net/xterm/ctlseqs/ctlseqs.html», Jul. 11, 2019, 66 pages.
"Alternate screen buffer has a bad scrollback experience", retrieved from «https://github.com/xtermjs/xterm.js/issues/802», Jul. 18, 2017, 4 pages.
"What does this mean in Python '\x1b[2K'?", retrieved from «https://stackoverflow.com/questions/55192019/what-does-this-mean-in-python-x1b2k», Mar. 15, 2019, 6 pages.
ANSI questions: "\x1B[?25h" and "\x1BE", retrieved from «https://stackoverflow.com/questions/15011478/ansi-questions-x1b25h-and-x1be», Feb. 22, 2015, 3 pages.
"Combined single buffer", retrieved from «https://github.com/xtermjs/xterm.js/issues/1942», Feb. 13, 2019, 3 pages.
"JavaScript", retrieved from «https://en.wikipedia.org/wiki/JavaScript», Aug. 8, 2018, 19 pages.
"Terminal emulator", retrieved from «https://en.wikipedia.org/wiki/Terminal_emulator», Jan. 17, 2018, 3 pages.
"How to use hterm from my browser, and is it just as secure as my regular terminal emulator?", retrieved from «https://webapps.stackexchange.com/questions/41781/how-to-use-hterm-from-my-browser-and-is-it-just-as-secure-as-my-regular-termina», Apr. 13, 2017, 3 pages.
"hterm and Secure Shell", retrieved from «https://chromium.googlesource.com/apps/libapps/+/master/hterm/doc/embed.md», no later than Aug. 8, 2018, 5 pages.
Daniel Imms, "Integrated Terminal Performance Improvements", retrieved from «https://code.visualstudio.com/blogs/2017/10/03/terminal-renderer», Oct. 3, 2017, 5 pages.
"ECMAScript", retrieved from «http://en.wikipedia.org/wiki/ECMAScript», May 11, 2015, 9 pages.
"Mobile-shell / mosh", Retrieved from: https://github.com/mobile-shell/mosh/blob/master/man/mosh.1, Aug. 3, 2017, 08 Pages.
"International Search Report and Written Opinion Issued in PCT Application No. PCT/US20/038854", dated Oct. 2, 2020, 16 Pages.

* cited by examiner

LOCALLY IMPLEMENTED TERMINAL LATENCY MITIGATION

BACKGROUND

Noon Access to a computing system can be used to enter commands, and to receive notifications, command results, and other data, for example. For many computing systems, access is provided at least in part through a system console, which may also be referred to simply as a "console". Although some distinctions may be made, for present purposes terms such as "system console", "console", "command line interface", and "terminal" all refer to an interface for entering information using a keyboard and receiving information using a display, in which at least part of the information includes character content. The character content may be encoded as ASCII, EBCDIC, Unicode, or other content. Character content often includes both printable characters (e.g., the alpha-numeric characters "a" through "z", "A" through "Z", and "0" through "9"), and non-printable characters (e.g., line feed, carriage return, and other control characters). The character content may represent items in an alphabet, or logographic items such as kanji, or other graphic items such as WingDings® font character glyphs (mark of Microsoft Corporation).

A console typically includes a keyboard and a screen; some consoles also include other I/O devices such as a mouse, tablet, or pen. A console's keyboard may be a virtual keyboard, e.g., displayed and operated through a touch screen, or the console keyboard may be a physical keyboard which has separate physical keys. A console may include built-in hardware, as in a laptop. A console may include removable hardware, as often happens with pluggable workstation monitors, pluggable or wireless keyboards, and KVM switches. Some computing systems, such as laptops and smartphones, are designed with a built-in physical or virtual console and hence with the understanding that a console will normally be available. Other computing systems, such as many data center servers, normally operate without a connected console. A console may be connected to a nearby computing system, e.g., using an RS-232 cable, or the console may be connected to a physically distant (e.g., kilometers or miles away) computing system, e.g., using TCP/IP communications over a network.

SUMMARY

Some embodiments described in this document provide improved performance of computing consoles which communicate over a network. In particular, some embodiments embed latency mitigation functionality within a terminal emulator. The latency mitigation functionality reduces perceived and actual delays during use of the terminal emulator as a console, by making accurate predictions about the responses a remote service will provide to key press data that is received by the terminal emulator from a local keyboard and transmitted to the remote service.

Some latency-mitigated terminal embodiments described herein include or are in operable communication with a display, a keyboard, a memory, and a processor. The terminal is also in operable communication over a network with a remote service. The remoteness of the service or other factors, such as heavy network loads, insufficient or improperly configured network devices, or dropped packets, creates network transmission latency that may make use of the terminal frustrating or inefficient in the absence of good latency mitigation.

The terminal processor is configured by terminal emulator software which upon execution by the processor performs terminal emulator latency mitigation steps. These latency mitigation steps may include receiving key press data which identifies a pressed key, transmitting the pressed key data toward the remote service, and locating a prediction that is associated with the key press data. The steps may also include obtaining a prediction string from the prediction, and writing the prediction string to the display. The prediction string may include one or more characters. The prediction string may be written together with a prediction indication that visually indicates the prediction string is based on a response prediction as opposed to being based on an actual response from the remote service.

After writing the prediction string to the display, this example terminal gets a response to the pressed key from the remote service, and compares the response to the prediction string. When the prediction string is determined to be an accurate prediction because the response matches the prediction string, this terminal treats the prediction as accurate. For example, the terminal may modify the display to show the prediction string without the prediction indication, if a prediction indication was shown. When the prediction string is determined to not be an accurate prediction because the response does not match the prediction string, then the terminal treats the prediction as inaccurate, e.g., by modifying the display to replace the prediction string and the prediction indication (if any) by the response from the remote service.

This example terminal repeats the foregoing steps with additional pressed keys and additional responses. As a result, latency of remote service responses to key press data received by the terminal from the user is mitigated by at least one accurate prediction. The prediction string is displayed to the user, as if it were the response (or as an explicit prediction thereof), prior to receipt at the terminal of the actual response.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
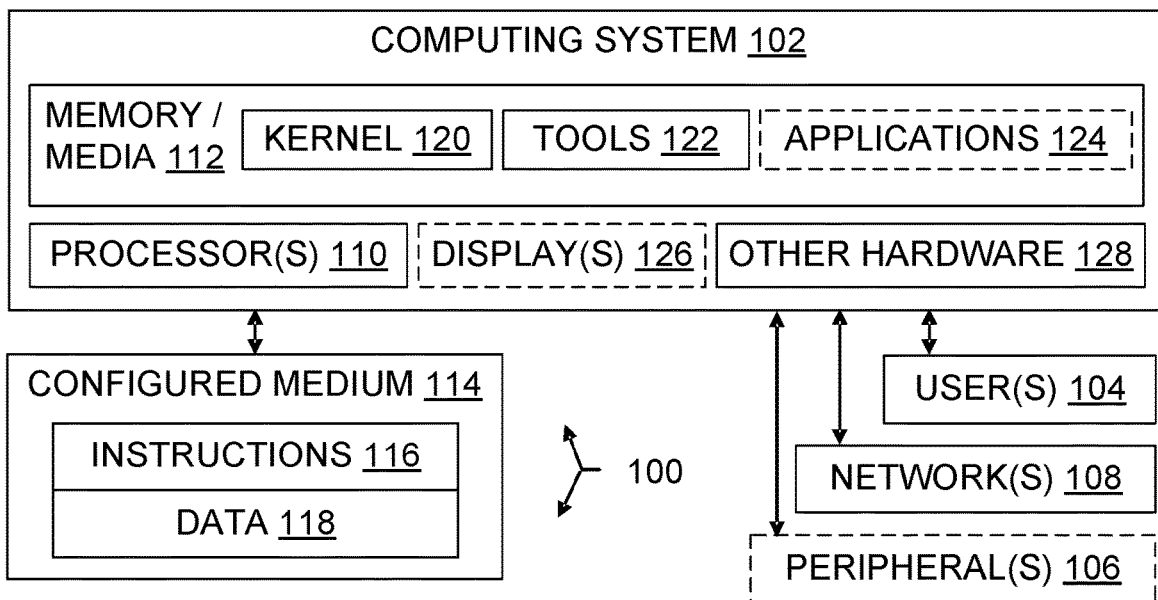
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by a Microsoft innovator who was working to improve the ease of use of Microsoft Azure® cloud offerings (mark of Microsoft Corporation) which use a terminal to connect to a remote computer, such as cloud development tools and cloud administration tools. In addition to providing commercial Azure® offerings, Microsoft is itself a user of many Azure® solutions. Hence, Microsoft is doubly motivated to monitor and improve Azure® performance, both on behalf of Microsoft customers and to help Microsoft in the development and administration of Microsoft's own cloud resources and tools.

In particular, a technical challenge was to how to address the latency caused by network transmissions between a local terminal and a remote computer. For example, when connecting a terminal to a remote computer using SSH, there is a delay between the time at which a key is pressed and an instruction is sent to the remote machine, and the time when the remote machine's response gets back to the terminal. This delay (i.e., latency) can be large or small, depending for example on a user's internet connection and the physical distance to the remote computer.

One approach to this network latency challenge is to increase the speed of the network. Another approach is to increase the processing speed at the remote computer. Both of these approaches may be helpful, and either or both may be used in combination with the teachings provided herein. However, the focus herein is on mitigating terminal latency by rapidly making accurate predictions of the remote computer's responses, and displaying those predictions to the user quickly, as opposed to waiting for the actual responses before displaying something when the user presses one or more terminal keys. Even when some of the predictions are inaccurate and hence get corrected after the actual response is received at the terminal, latency can be mitigated by the accurate predictions.

For example, suppose a user presses an "A" key. A terminal may then quickly display "A" on the screen, and then send the "A" to the remote computer, instead of waiting for the remote computer's response to the "A" before printing anything on the display. If the response is indeed an "A" then the prediction is accurate, and the latency is mitigated. The user will have been shown the "A" without having been made to wait for the "A" to arrive from the remote computer. If the remote computer's response is not "A" then the prediction was not accurate, and the display will be corrected accordingly.

One of skill will understand that latency mitigation therefore differs from a mere local echo of whatever the user types, because latency mitigation makes predictions. Latency mitigation also corrects displayed inaccurate predictions, based on responses from the remote computer. Mere local echo does not make predictions or undo the effects of inaccurate predictions. Local echo simply echoes locally whatever key is typed, in addition to sending that key press data to the remote computer.

One of skill will also understand that a response from a remote computer may depart for various reasons from a naïve expectation that the key pressed and the response received will always be the same. The remote computer may perform auto-correction or auto-completion for example. The remote computer's response may often include characters that were not pressed at the terminal, as when the user types a command into the terminal and the remote computer echoes back the command followed by output generated by an execution of the command.

Some embodiments herein provide latency mitigation quickly, by using computationally efficient prediction mechanisms, e.g., prediction string look-ups (efficient) as opposed to using machine learning model execution (expensive) or complex statistical calculations (also expensive) to make predictions. Reliance on the remote computer to store or create predictions used at the local terminal is avoided in some embodiments, which increases terminal independence from the kernel and configuration of the remote computer. Some embodiments correct inaccurate predictions without relying on the remote computer for anything except the key press data responses. This helps reduce the impact of network latency or remote computer processing delays on terminal latency. These performance benefit scenarios are merely examples. One of skill will recognize that the teachings provided herein have beneficial applicability to many other scenarios as well.

Some embodiments described herein may be viewed by some people in a broader context. For instance, concepts such as accuracy, delay, distance, performance, and writing may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce or otherwise mitigate terminal latency in a computing system. Other configured storage media, systems, and processes involving accuracy, delay, distance, performance, or writing are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, actions, responses, scenarios, operating systems, software development environments, encoding formats, software processes, development tools, identifiers, files, data structures, notations, control flows, pseudocode, naming conventions, resource types, network protocols, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a local user device and a remote service device in a cloud or other computer network, and predicting user input to a computing terminal, which are each activities deeply rooted in computing technology. Some of the technical mechanisms discussed include, e.g., prediction data structures, prediction queues, screen buffers, control sequences, network protocols, and character encodings. Some of the technical effects discussed include, e.g., mitigation of terminal latency, and correction of displayed characters based on received responses. Thus, purely mental processes are clearly excluded. Some embodiments improve the functioning of computing systems and services by mitigating (reducing, or repositioning to aid usability) the latency of terminals, including terminal emulators. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
ANSI: American National Standards Institute
API: application program interface
ASCII: American Standard Code for Information Interchange
BIOS: basic input/output system
CD: compact disc
CPU: central processing unit
DVD: digital versatile disk or digital video disc
EBCDIC: Extended Binary Coded Decimal Interchange Code
FPGA: field-programmable gate array
FPU: floating point processing unit
GPU: graphical processing unit
GUI: graphical user interface
GUID: globally unique identifier
HTTP: hypertext transfer protocol
HTTPS: hypertext transfer protocol secure
IaaS or IAAS: infrastructure-as-a-service
ID: identification or identity
IDE: integrated development environment
IoT: internet of things
IP: internet protocol
KVM: keyboard, video, and mouse
LAN: local area network
OS: operating system
PaaS or PAAS: platform-as-a-service
RAM: random access memory
ROM: read only memory
SSL: secure sockets layer
TCP: transport control protocol
TLS: transport layer security
UDP: user datagram protocol
UEFI: Unified Extensible Firmware Interface
VM: virtual machine
VT100: originally referred to a Digital Equipment Corporation video terminal, but now also refers to terminals from any vendor which can emulate at least some functionality of the VT100 terminal
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

"Type" and "press" are used interchangeably herein with regard to entering data using a keyboard. Similarly, "print" and "write" are used interchangeably herein with regard to updating a display.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Latency mitigation operations such as receiving key press data, transmitting key press data toward a remote networked computer, locating a prediction (which is a data structure), visually indicating a prediction on a display, comparing strings, and many other operations discussed herein, are understood to be inherently digital. A human mind cannot interface directly with a CPU or other processor, or with RAM or other digital storage, to read and write the necessary data to perform the terminal latency mitigation steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as caching, comparing, computing, creating, designating, disabling, displaying, employing, emulating, enabling, generating, getting, indicating, inferring, locating, maintaining, mitigating, modifying, obtaining, operating, performing, predicting, pressing, providing, receiving, reducing, removing, replacing, residing, sending, storing, transmitting, treating, undoing, using, utilizing, writing (and caches, cached, compares, compared, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
200 client device; may also be referred to as a "terminal"
202 terminal emulator
204 shell; may also be referred to as "command line interface"; some familiar examples include bash, csh, zsh, ash, COMMAND.COM, CMD.EXE, and a PowerShell® shell (mark of Microsoft Corporation)
206 cloud
208 server device
210 service
300 aspect of a terminal
302 terminal; unless stated otherwise, a terminal 302 is assumed to include terminal emulator software 404 or functionally equivalent circuitry and other hardware; unless stated otherwise, a terminal 302 is assumed to have terminal latency mitigating capability 306
304 display writing capability, e.g., software and hardware which performs writing characters on a display 126
306 terminal latency mitigating capability
308 keyboard (physical or virtual)
310 key of a keyboard, e.g., the "a" key
312 character produced by pressing one or more keys 310, e.g., the "A" character is produced by pressing the shift key and the "a" key at the same time
314 latency; unless otherwise stated, refers to terminal latency, which is the actual or perceived delay between a key press and a corresponding screen update such as a character being displayed
316 normal screen buffer; this term is used by one of skill in, e.g., discussions of xterm control sequences; one or more terminal buffers hold the text that is stored in a terminal
318 alternate screen buffer; this term is used by one of skill in, e.g., discussions of xterm control sequences
320 control sequence; may also be referred to as an "ANSI escape sequence", "VT100 code", "ANSI terminal control sequence", or "ANSI escape code", for example
322 cursor
324 position of cursor on screen
326 viewport; a terminal viewport is a grid of cells that is visible to the user; the viewport is at the very bottom of the terminal's active buffer
328 scrollback functionality
330 input to terminal or a portion thereof
332 input portion boundary
334 integrated development environment (IDE)
402 key press data, e.g., character content such as an ASCII code, EBCDIC code, Unicode value, or other character encoding, representing, e.g., <control-C>, or <shift-m>, or <control-escape-k>, or <8>, or <left arrow>, or <backspace>, or <space> or some other combination of one or more keys; in some embodiments, key press data may also include context such as formatting or screen position; in some embodiments key press data may include signals indicating which key(s) were pressed, and then the terminal emulator software translates those signals into Unicode or other character content
404 terminal emulator software
406 prediction data structure
408 queue of zero or more predictions 406 themselves or references to zero or more predictions 406; in some embodiments, the prediction queue operates as a FIFO queue; the prediction queue 408 may be implemented using a list, tree, hash table, or other data structure to permit either quickly finding a prediction string that matches key press data or else quickly ascertaining that no prediction is present for the given key press data (in which case latency mitigation via prediction is not performed)

410 a transmission including at least keypress data from terminal emulator software toward a remote service

412 a response including at least keypress data from remote service toward terminal emulator software

414 prediction class, e.g., a group of predictions whose prediction strings have only (or alternately, have at least) characters belonging to a specified set of characters, e.g., a prediction class of alpha-numeric characters, or an escape prediction class

416 secure shell protocol; also referred to as "SSH"

418 network protocol stack

420 display cell

500 characterization of a terminal, that is, a functional, operational, implemented, or other technical capability or technical constraint of a terminal

502 single-ended fully local operation, as opposed to, e.g., operation which relies upon predictive or other speculative processing performed at a remote computer

504 latency-mitigated secure shell protocol usage during transmissions 410 of key press data to a remote computer from a terminal 302 and also during receipt at the terminal 302 from the remote computer of key press data in responses 412; this characterization is different than, e.g., usage of SSH only during an initialization of communication or pairing of a client 200 and a server 208 and not during the exchanges of key press data between them

506 avoiding reliance on (or even better, the existence of) predictions or other speculations about service 210 responses 412 that are located on the remote server 208 that has the service 210, as opposed to being located on the client 200 that has the terminal emulator 202

508 avoiding reliance on (or even better, the existence of) predictions or other speculations about service 210 responses 412 that are located inside a shell 204 process, as opposed, e.g., to being located inside a different process that is neither the shell process nor a child (e.g., forked from, spawned by) the shell process

Figure 7:
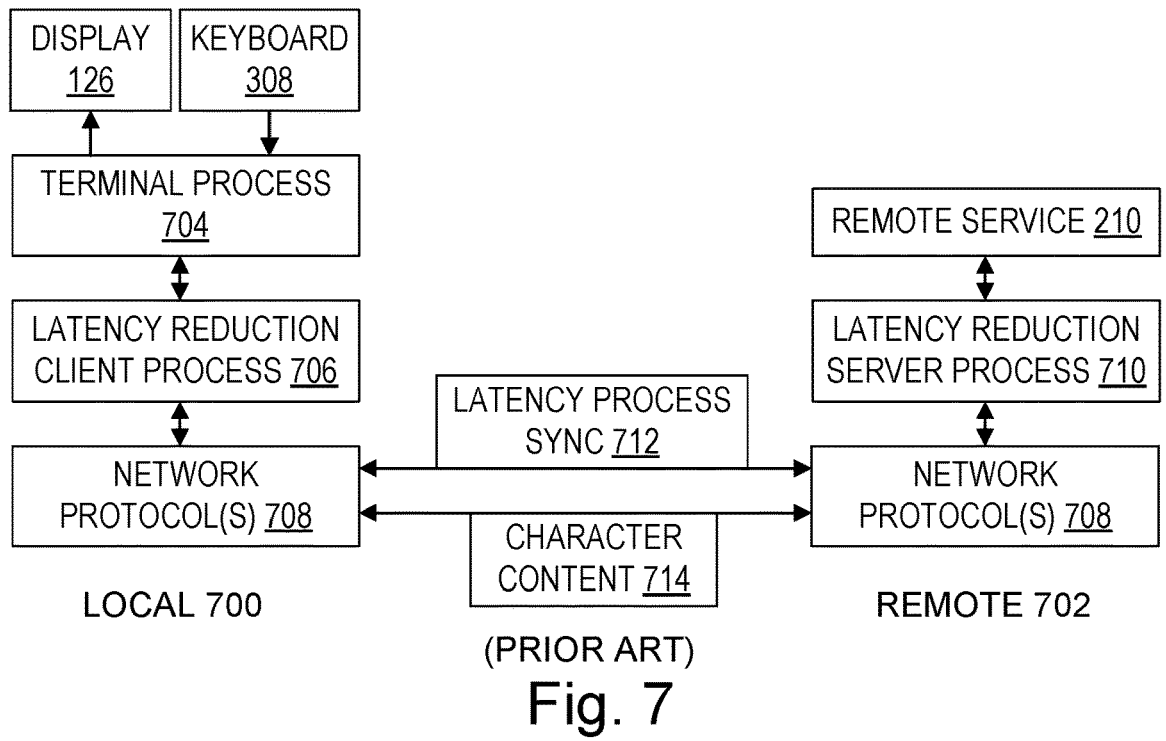
FIG. 7 is a flow diagram illustrating an architecture which splits terminal latency reduction functionality between a local site and a remote site, contrary to some teachings provided herein.

510 independence from a kernel 120 that the remote service 210 runs on top of; when such independence is present, the terminal 302 can interact usefully with remote servers 208 that employ any commercial or experimental or other kernel 120 which supports the service 210; this characterization may also be referred to as part of a "server-kernel-agnostic terminal"; this characterization is not present, e.g., in an architecture like that shown in FIG. 7 where a terminal relies on a server-based latency reduction process that is tailored to a particular kind of server kernel

600 aspect of a prediction 406

602 prediction string; this string gets matched against key press data from the keyboard by the terminal 302 in order to locate a relevant prediction data structure

604 prediction indication, also referred to as "prediction indicator"; this formatting visually distinguishes displayed predictions from displayed actual responses; it may include, e.g., underlining, bold, italics, a different font, flashing, a different background or foreground color, or other text formatting

606 undo string; this string is written to the display to undo prediction string displays, and any prediction indication shown with them, when a prediction is determined to be inaccurate

608 sequence of predictions

610 lead (first, initial) prediction in a sequence 608 of interest

612 cache of pressed key data 402

700 local site

702 remote site

704 terminal process, e.g., a terminal emulator 202 process, which does not have the latency mitigation capability 306 taught herein

706 latency reduction client process, namely, a process running on a client 200 which helps provide some latency reduction functionality, but not the latency mitigation capability 306 taught herein

708 network protocol; may be implemented in a network stack 418

710 latency reduction server process, namely, a process running on a server 208 which helps provide some latency reduction functionality, but not the latency mitigation capability 306 taught herein

712 synchronization data passed between latency reduction client process 706 and latency reduction server process 710

714 character content such as an ASCII code, EBCDIC code, Unicode value, or other character encoding

802 terminal process (also referred to as "terminal emulation process" or as "terminal emulator") which has a latency mitigation capability 306 taught herein

900 key press data class; also referred to as a "prediction class"

902 cursor positioning key press data, e.g., an arrow key, page up key, page down key, home key, end key, or any other key that moves the display cursor without also printing a printable character

904 control key press data, e.g., control-C, control-Z, control-alt-delete, Apple command key ⌘, Microsoft Windows logo key (marks of their respective owners)

906 escape key press data, e.g., escape, escape-M

908 alt key press data, e.g., alt-tab, control-alt-delete

910 alpha-numeric character key press data (also referred to as "alphanumeric"), e.g., "a" through "z", "A" through "Z", or "0" through "9"; may also include other printable characters, e.g., punctuation, emoji, kanji, etc.

912 function key press data, e.g., F1 through F12, Print Screen, vendor-specific key; note that different implementations may classify a given key press differently, e.g., groups 904, 906, 908, and 912 may be combined into a single modifiers class, or control-escape may be classified as a control key 904 in one implementation and as an escape key 906 in another implementation

1000 a scenario that lacks terminal latency mitigation as taught herein

1100 a scenario that includes successful terminal latency mitigation achieved by way of an accurate prediction

1200 a scenario that includes an attempted latency mitigation, in which terminal latency mitigation is not achieved due to an inaccurate prediction

1300 a scenario that includes successful terminal latency mitigation achieved by way of two consecutive overlapping accurate predictions

1400 a scenario that includes an attempted latency mitigation, in which terminal latency mitigation is not achieved due to an inaccurate prediction, and in which the effect of two or more predictions is undone

Figure 15:
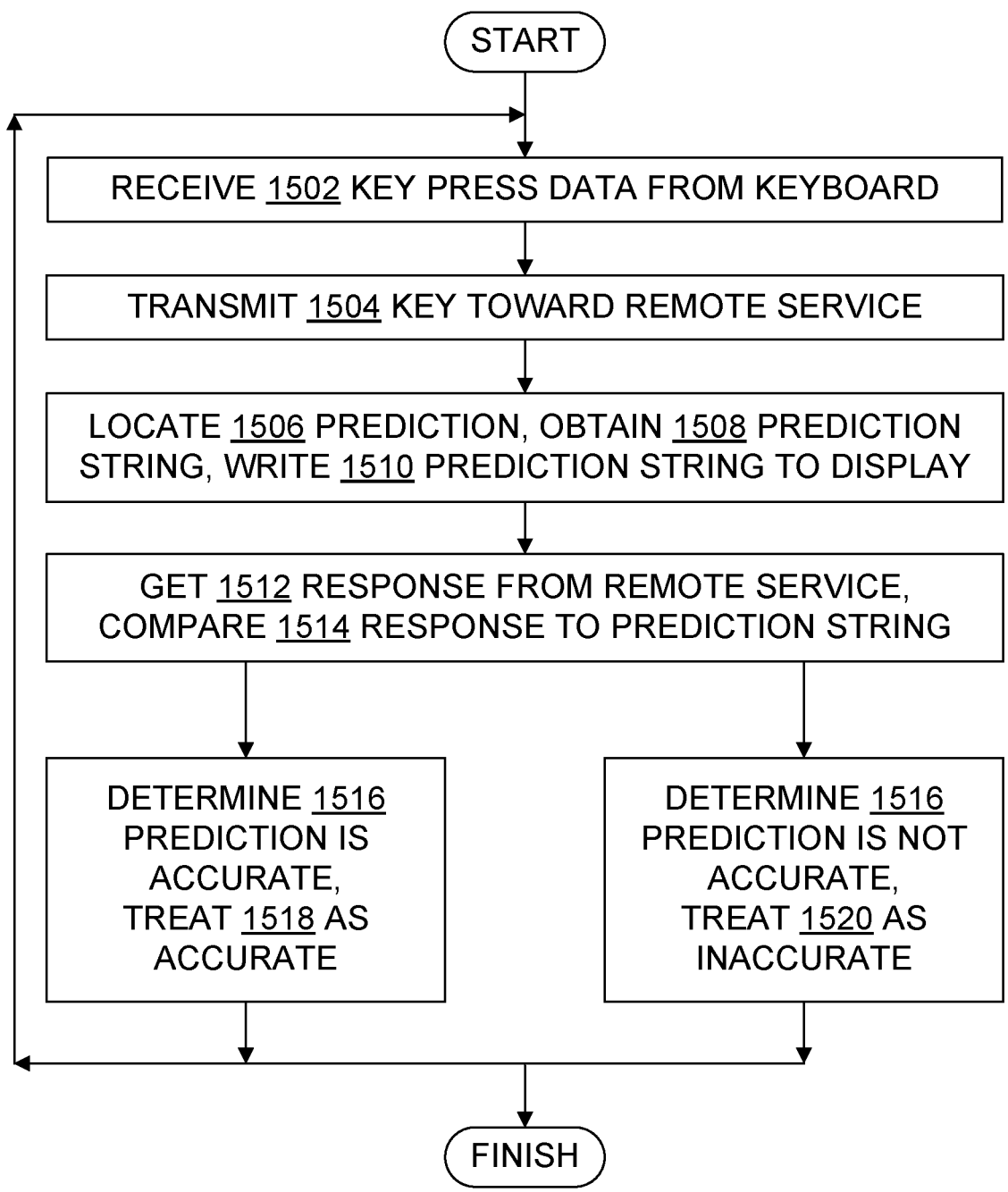
FIG. 15 is a flowchart illustrating steps in some terminal latency mitigation methods.

1500 flowchart; 1500 also refers to latency mitigation methods illustrated by or consistent with the FIG. 15 flowchart

1502 receive key press data from keyboard, e.g., using signals, screen buffer, interrupts, and other familiar technical mechanisms

1504 transmit key press data toward remote service, e.g., using network buffer, network stack, network interface card, and other familiar technical mechanisms

1506 locate prediction, e.g., by string matching prediction string of prediction with received key press data; may be accomplished using tree, list, array, hash table, or another data structure which organizes predictions to aid searching their strings 602 for a match

1508 obtain prediction string, e.g., by accessing its location within a prediction data structure 406 in memory 112

1510 write prediction string to display, e.g., using signals, screen buffer, interrupts, and other familiar technical mechanisms

1512 get response 412 from remote service 210, e.g., using network buffer, network stack, network interface card, and other familiar technical mechanisms

1514 compare character content 714 of response 412 to obtained and displayed prediction string 602, e.g., by string comparison operations

1516 determine whether prediction is accurate, e.g., by determining whether comparison 1514 shows that response content matches displayed string's content—match means accurate, no match means not accurate

1518 treat prediction as accurate, e.g., by removing displayed prediction indication if one was shown, and by updating prediction queue to remove lead prediction and make the next prediction in the queue the lead prediction when a lead prediction is determined to be accurate

1520 treat prediction as inaccurate, e.g., by removing displayed prediction string, and by updating prediction queue to remove lead prediction and subsequent predictions from the queue

Figure 16:
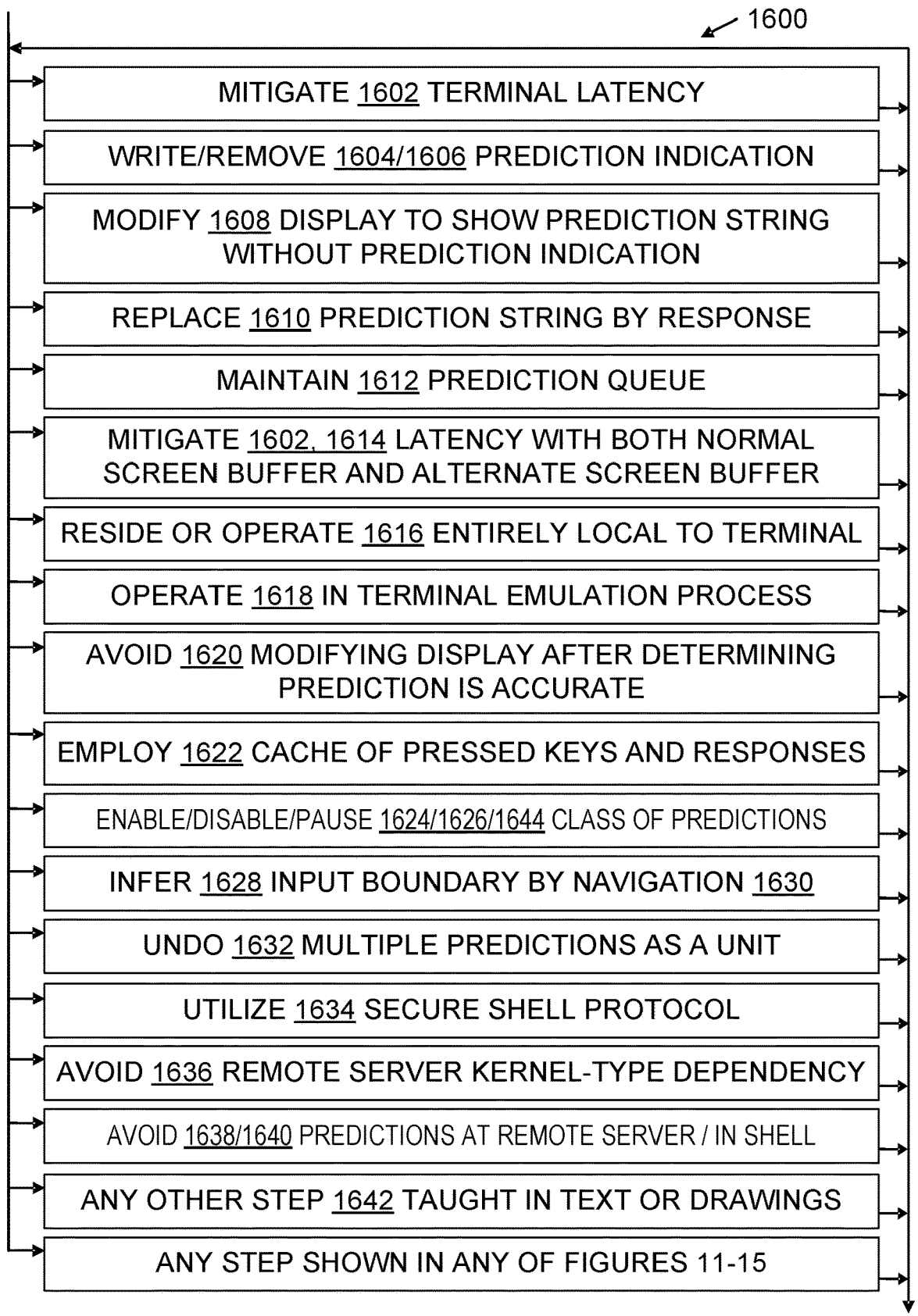
FIG. 16 is a flowchart further illustrating steps in some terminal latency mitigation methods.

1600 flowchart; 1600 also refers to latency mitigation methods illustrated by or consistent with the FIG. 16 flowchart (which incorporates the steps of FIGS. 11-15)

1602 mitigate terminal latency

1604 write a prediction indication to the display

1606 remove a prediction indication from the display; may also replace a displayed prediction string, or not, depending on accuracy of the prediction string

1608 modify display to show prediction string without prediction indication; this is a special case of 1606 in which the prediction string is accurate

1610 replace prediction string by response when prediction string is not determined to be accurate

1612 maintain a prediction queue, e.g., by adding unresolved prediction(s) to the queue and removing resolved predictions from the queue; resolution is based on determination of (in) accuracy

1614 mitigate latency both with a normal screen buffer and with an alternate screen buffer

1616 reside or operate entirely local to a terminal, as opposed, e.g., to residing or operating at least partially on a remote server

1618 operate in a terminal emulation process, as opposed, e.g., to operating in a separate process that is on the terminal client 200 but outside the terminal emulator 202 process

1620 avoid modifying the display after determining a prediction string displayed on the display is accurate; this presumes no prediction indication is used and hence no prediction indication needs to be removed

1622 employ a cache of pressed keys and responses

1624 enable a class of predictions, e.g., make them locatable 1506 and obtainable 1508

1626 disable or 1644 pause a class of predictions, e.g., make them not locatable 1506 or not obtainable 1508 or both

1628 infer an input boundary

1630 navigate screen position, e.g., move the cursor location on the display

1632 undo multiple predictions as a unit, e.g., after determining that one prediction is not accurate, undo the display effects of that prediction and of one or more other predictions without also checking the accuracy of the one or more other predictions

1634 utilize at a client 200 a secure shell protocol for transmitting 1504 to the remote server and for getting 1512 responses from the remote server

1636 avoid a dependency on a particular kind of remote server kernel, e.g., by having terminal latency mitigation functionality reside and operate entirely locally within a terminal client 200

1638 avoid creating, storing, updating, or otherwise processing at a remote server 208 any response predictions or other speculations about a remote service's responses to key press data that is entered at a terminal client 200

1640 avoid creating, storing, updating, or otherwise processing in a shell 204 at a terminal client 200 any response predictions or other speculations about a remote service's responses to key press data that is entered at the terminal client 200

1642 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122, 334 which provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C # ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 9, some embodiments use or provide a functionality-enhanced system 302. The functionality enhancement promotes security, correctness, and usability by facilitating consistent and convenient terminal latency mitigation. When terminals connected to remote servers exhibit less latency, those terminals are used more, thereby facilitating security checks and updates, configuration corrections, and other administrative operations on remote servers 208 via a local terminal 200.

Figure 2:
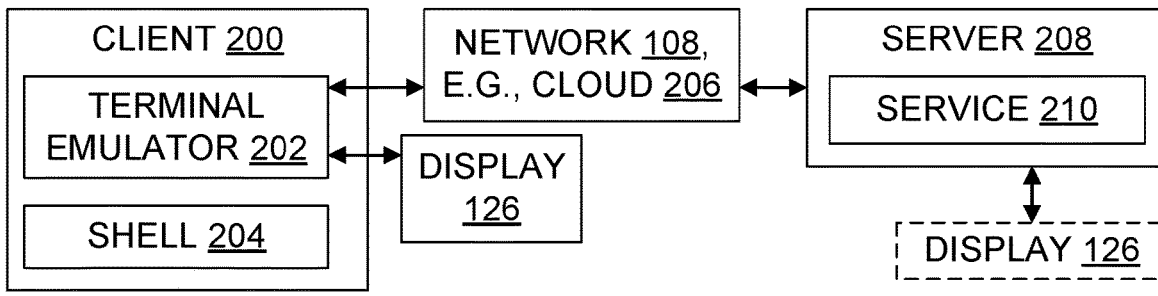
FIG. 2 is a block diagram illustrating an environment which includes a terminal emulator communicating over a network with a service.

As shown in the example of FIG. 2, a client device 200 runs a terminal emulator 202, and serves as a terminal connected to a remote server. Often the client also runs a shell 204. The client has a local keyboard 308 and local display 126, making a keyboard and display unnecessary at the remote server 208. The user can interact with one or more remote services 210 using the local terminal 200, when the terminal 200 and the server 208 are connected in a cloud 206 or by another network 108. However, latency 314 arising from network device delays and from round-trip transmission between the client 200 and the server 208 often reduces usability of the terminal unless the latency is mitigated somehow.

Figure 3:
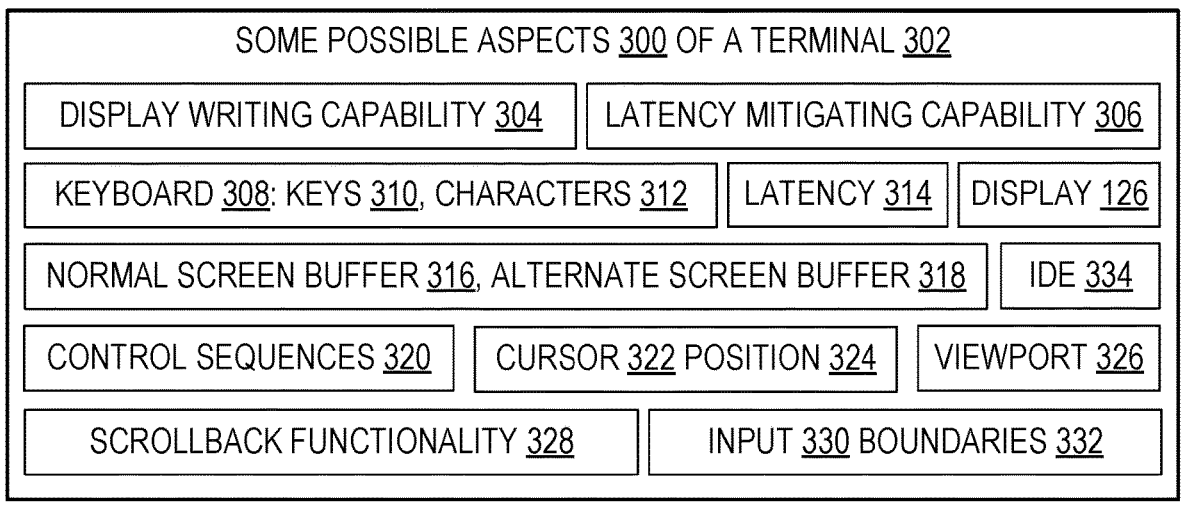
FIG. 3 is a block diagram illustrating some aspects of some terminals.

FIG. 3 shows some aspects 300 of some latency-mitigated terminals 302, which are not necessarily mutually exclusive of each other. The illustrated aspects include a display writing capability 304, and a latency mitigating capability 306. Display writing involves a keyboard 308 of keys 310, at least some of which have associated characters 312, as well as a display 126. Key presses generally result in characters being shown on the display. The display may be organized to have a normal screen buffer 316 and an alternate screen buffer 318. Software such as a shell 204, an integrated development environment 334, other tools 122, or applications 124 may run on the client 200 and interact with the user 104 through the terminal 302. Interactions may show text in a viewport 326, may change the position 324 of a cursor 322 on the display, may accept input 330 within certain boundaries 332, and may exercise scrollback functionality 328, for example. One of skill in the art will be generally familiar with usage of a terminal from a user's point of view.

Figure 4:
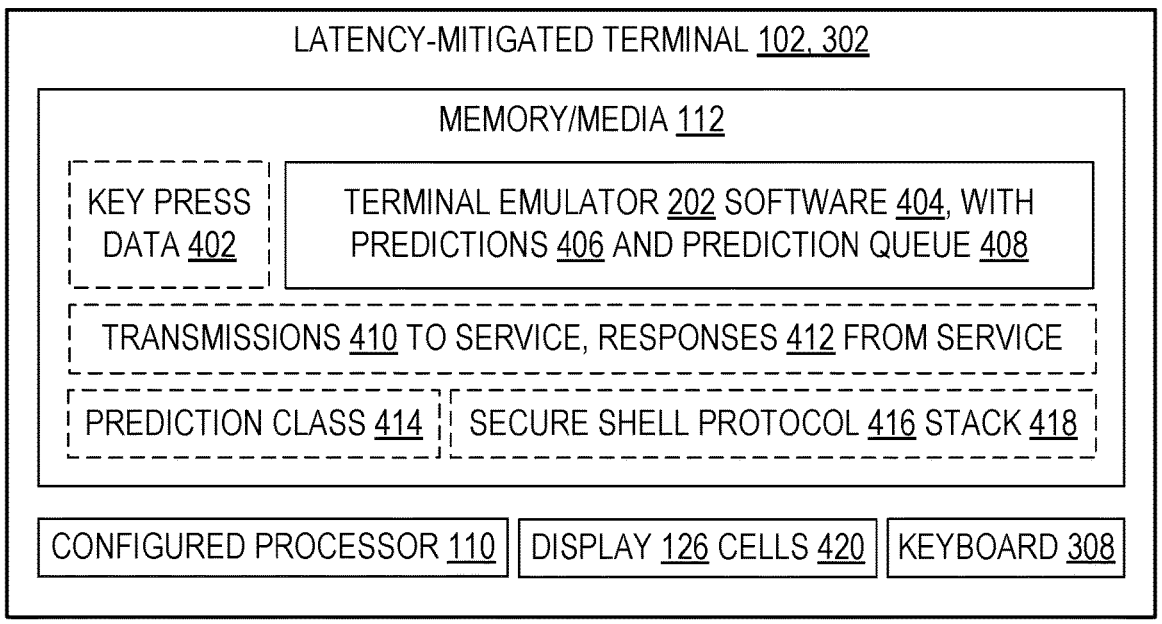
FIG. 4 is a block diagram illustrating aspects of a terminal which is configured with a latency mitigation functionality.

FIG. 4 further illustrates some embodiments of a latency-mitigated terminal 302. The illustrated system 302 includes a hardware 110, 112, and 126, and a terminal emulator 202 with terminal emulation software 404. This terminal emulator 202 employs prediction data structures 406 and a prediction queue data structure 408. As indicated by the dashed lines in FIG. 4, at a given point in time a latency-mitigated terminal 302 may include data such as key press data 402 from a user, transmissions 410 to a remote service, and responses 412 from the remote service.

As also indicated by dashed lines in FIG. 4, some embodiments include prediction classes 414 to facilitate enabling or disabling certain predictions in certain circumstances. For example, an embodiment may disable alpha-numeric predictions when a user is running an editor 122 that is not in an alpha-numeric input mode, but may still recognize certain control sequences 320, such as one to put the editor into alpha-numeric input mode.

As also indicated by dashed lines in FIG. 4, some embodiments include a network stack 418 implementing a secure shell protocol 416. The network stack 418 in a given embodiment may implement various protocols 708, such as SSH, TCP/IP, UDP, and others.

Other embodiments consistent with teachings herein may organize latency-mitigated terminal 302 functionality differently than is shown in these Figures.

Figure 5:
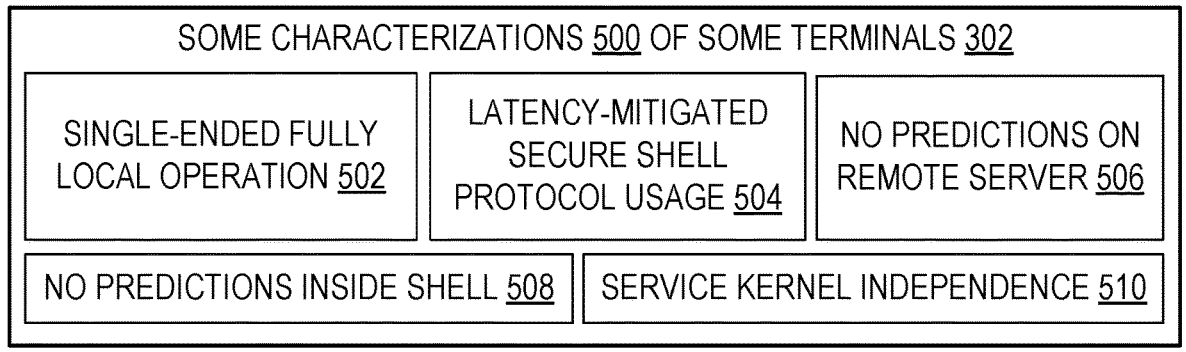
FIG. 5 is a block diagram illustrating some characterizations of some terminals.

FIG. 5 shows some characterizations 500 of some latency-mitigated terminals 302. The illustrated characterizations include single-ended fully local operation 502, usage 504 of a latency-mitigated secure shell protocol 416, avoidance 506 of predictions 406 on the remote server 208, avoidance 508 of predictions 406 inside the shell 204, and independence 510 from any particular kernel 120 being used on the remote server 208.

Some of these characterizations 500 are related to one another. For example, when all of the terminal latency mitigation functionality is in the client 200 (characterization 502) then there will not be any predictions on the remote server (characterization 506) and it will not matter to the terminal latency mitigation functionality what kind of kernel is running on the remote server (characterization 510). However, characterization 502 (fully local) does not require or imply characterization 504 (SSH) or characterization 508 (outside the shell), for example. Moreover, teachings herein may be implemented without necessarily imposing any of the particular example characterizations 500.

Figure 6:
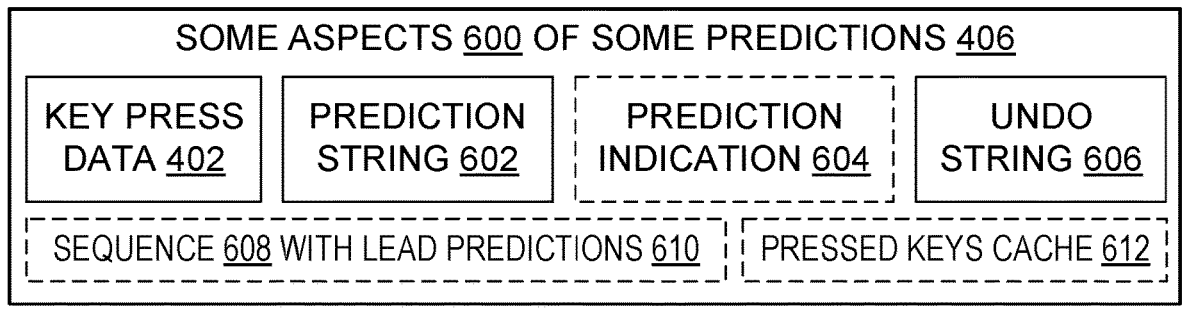
FIG. 6 is a block diagram illustrating some aspects of predictions that may be part of some latency-mitigated terminals.

FIG. 6 shows some possible aspects 600 of a prediction 406. A prediction string 602 may be compared to key press data 402 to determine whether a prediction should be treated as accurate. The prediction string 602 may be displayed with a visual prediction indication 604 when the prediction is unresolved (e.g., when the response has not yet come from the service 210 and thus the prediction's accuracy has not yet been determined). If the prediction is determined to be inaccurate, then an undo string 606 may be written to the display to undo the effect of displaying the inaccurate prediction string.

In some circumstances, a prediction 406 is part of a sequence 608 of predictions; it may be the lead prediction 610 or it may follow the lead prediction. As discussed herein, some embodiments undo an entire sequence 608 of predictions after determining that the lead prediction 610 of the sequence 608 is inaccurate.

Some embodiments employ a cache 612 of pressed keys data 402, to increase prediction accuracy. Such a cache may indicate, for example, that the last three times the user pressed "a" the service 210 responded with "A", so the prediction 406 associating "a" 402 with "a" 602 may be updated or overridden to effectively make "A" be the prediction string 602 for key press data "a" 402.

FIG. 7 shows a conventional architecture which splits terminal latency reduction functionality between a latency reduction client process 706 at a local site 700 and a latency reduction server process 710 at a remote site 702. The separate latency reduction processes 706 and 710 synchronize with each other over the network connection. These synchronization messages 712 and other messages, include character content 714, are sent and received using familiar network protocols 708, proprietary network protocols 708, or both.

This splitting of terminal latency reduction functionality between local and remote sites is contrary to characterization 502 (fully local) because the latency reduction server process 710 is not local to the client terminal 200.

Likewise, to the extent the latency reduction server process 710 includes speculative predictions, this FIG. 7 architecture lacks characterization 506 (no predictions on remote server).

In this architecture, there is also a strong possibility (at least) that the latency reduction server process 710 is tailored to a particular kind of server kernel, e.g., it may run fine on a Microsoft Windows® kernel but not on a *nix kernel, or vice versa (mark of Microsoft Corporation). This FIG. 7 architecture thus may well lack characterization 510 (service kernel independence).

Per this FIG. 7 architecture, the latency reduction client process 706 is implemented as a separate process outside a terminal process 704 which does not perform latency reduction. This aspect of the architecture does not inherently map to any of the FIG. 5 characterizations. However, if the latency reduction client process 706 is part of a shell 204, then characterization 508 (no predictions inside shell) would not be present.

Figure 8:
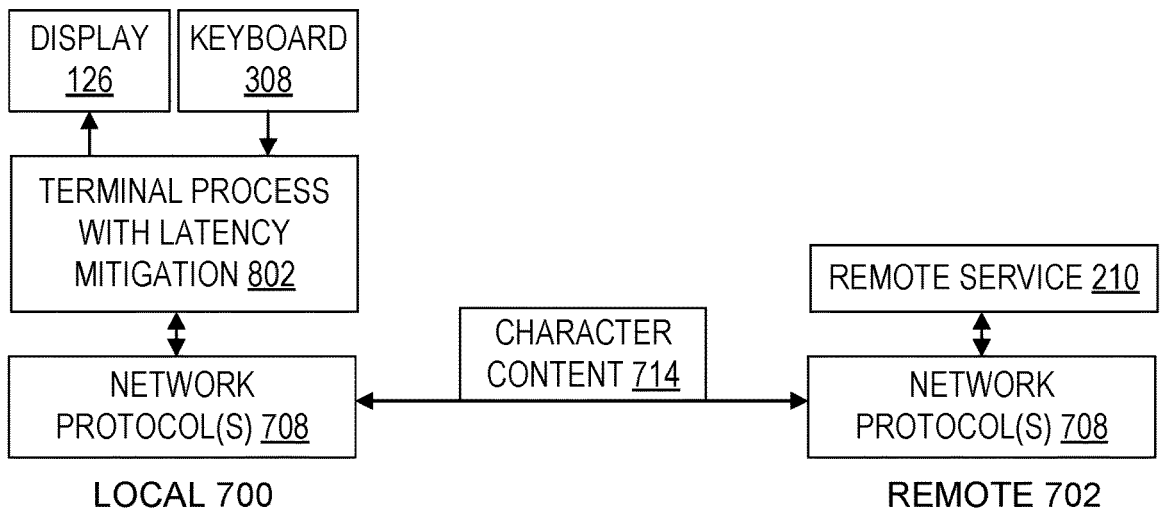
FIG. 8 is a flow diagram illustrating an architecture in which terminal latency mitigation functionality resides entirely at a local site, and also resides within a terminal process as opposed to residing in a shell.

FIG. 8 shows an architecture in which terminal latency mitigation functionality resides entirely at a local site 700, per characterization 502. In this example architecture, terminal latency mitigation functionality also resides within a terminal process 802 as opposed to residing in a shell 204, per characterization 508. But other architectures according to teachings herein may have the fully local operation characterization 502 without also having no predictions in a shell characterization 508. An advantage of characterization 508 is that when latency mitigation capability 306 is built into the terminal itself, a user can use their preferred conventional shell 204 but still get the benefits of latency 314 mitigation.

Figure 9:
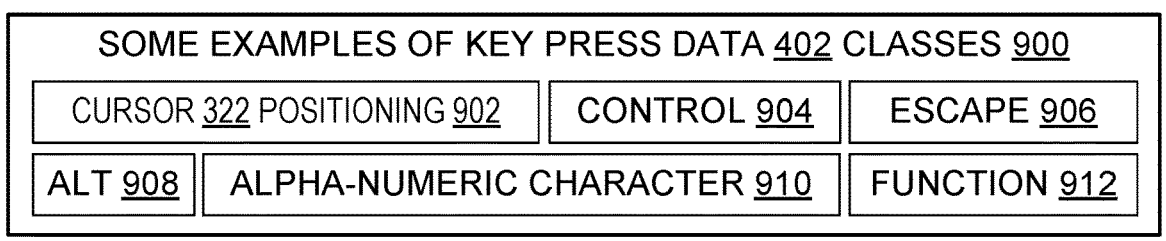
FIG. 9 is a block diagram illustrating some examples of key press data.

FIG. 9 shows some examples of key press data classes 900, which may also be referred to as prediction classes 900. Class 902 includes key press data that changes cursor 322 position, e.g., arrow keys. Class 904 includes control key press data, e.g., control-C and control-Z. Class 906 includes escape key press data, e.g., escape, escape-M. Class 908 includes alt key press data, e.g., alt-tab. Class 910 includes alpha-numeric character key press data, e.g., alphabet characters and numeric digits, with the understanding that some implementations of class 910 may also include other printable characters such as punctuation characters. Class 912 includes function characters, e.g., F1 or combinations which include a Fn or Fcn or Func or similarly labeled key.

Some embodiments use or provide a latency-mitigated terminal 302 which is or can be in operable communication over a network with a remote service 210. The latency-mitigated terminal 302 includes a display 126, a keyboard 308, a memory 112, and a processor 110 that is in operable communication with the display, the keyboard, and the memory. The processor 110 is configured to perform terminal emulator latency mitigation steps which may include (a) receiving first key press data 402 which identifies a first pressed key 310, (b) transmitting the first pressed key data toward the remote service, (c) locating a first prediction 406 that is associated with the first key press data, (d) obtaining a first prediction string 602 from the first prediction, and (e) writing the first prediction string to the display together with a prediction indication 604 that visually indicates the first prediction string is based on a response prediction as opposed to being based on a response from the remote service. After writing the first prediction string to the display, the steps may also include (f) getting from the remote service a first response 412 to the first pressed key, and (g) comparing the first response to the first prediction string. When the first prediction string is (h) determined to be an accurate prediction because the first response matches the first prediction string, then the steps include (i) modifying the display to show the first prediction string without the prediction indication. When the first prediction string is (h) determined to not be an accurate prediction because the first response does not match the first prediction string, then the steps include (j) modifying the display to replace the first prediction string and the prediction indication by the first response without the prediction indication. The steps may also include repeating the foregoing steps (a)-(h) and (i) or (j) or both, with additional pressed keys and additional responses, whereby latency of remote service responses to key press data received by the terminal is mitigated by at least one accurate prediction.

In some embodiments, the terminal further includes a prediction queue 408 residing in the memory. The prediction queue is configured to hold a prediction sequence 608 designating prediction strings 602 which have been displayed and have not yet been compared with respective responses from the remote service. These queue entries represent unresolved predictions.

In some embodiments, the terminal has a normal screen buffer 316 and an alternate screen buffer 318, and the normal screen buffer and the alternate screen buffer have different scrollback functionality 328 from one another. For example, a normal screen buffer may allow scrolling back N lines (N>0), while the alternate screen buffer does not allow scrolling back. In some such embodiments, the terminal emulator software 404 mitigates latency 314 for both buffers 316 and 318, in that the terminal emulator software performs the terminal emulator latency mitigation steps with the alternate screen buffer 318 and also performs the terminal emulator latency mitigation steps with the normal screen buffer 316. In some embodiments, a state variable in the terminal emulator tracks which terminal buffer is currently active, i.e., displayed to the user. In some embodiments, a default or normal set of predictions is enabled when the normal screen buffer is in use, but predictions are disabled 1626 when the alternate screen buffer is in use, unless the application in use is on an inclusion list of recognized applications. An embodiment may record how successful predictions are for a given application 124, and use that measure of success as a basis for calculating whether to enable predictions for that application. For instance, an embodiment may calculate that predictions for the *nix "top" command will likely fail, so when "top" is launched predictions are disabled. Predictions may also be less successful during use of the alternate screen buffer if that use brings with it more frequent screen redraws or a user interface that draws borders out of various characters, for example.

In some embodiments, the predictions 406 reside entirely local to the terminal 200. In these, characterization 502 applies.

In some embodiments, a latency mitigating capability 306 and a display writing capability 304 each operate together in a terminal emulation process 802, as opposed to the latency mitigating capability residing in a separate process from the display writing capability.

In some embodiments, the terminal 200 further includes a cache 612 of pressed keys 402 and their respective responses 412. This cache 612 may be employed to replace or supplement correlation of pressed keys with prediction strings that is done using a default search method for locating predictions and obtaining prediction strings.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples, component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Operation Scenarios

FIGS. 10 through 14 illustrate various scenarios involving successful terminal latency mitigation, attempted but unsuccessful terminal latency mitigation, and a failure to even attempt terminal latency mitigation.

Figure 10:
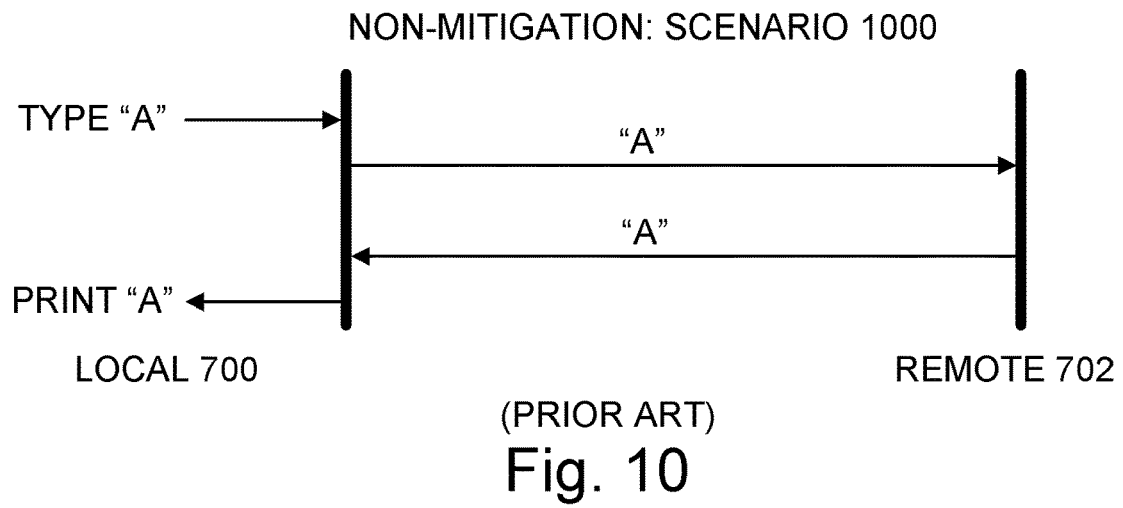
FIG. 10 is a sequence diagram illustrating a scenario that lacks terminal latency mitigation as taught herein.

FIG. 10 illustrates a scenario 1000 that lacks any terminal latency mitigation as taught herein; mitigation is not even attempted. A user 104 types a character "A" into a terminal 200, and the terminal sends the "A" to a remote service. After the remote service sends back "A" as its response, the terminal writes that "A" on the local display. The unmitigated latency 314 perceived by the user extends from the typing of the "A" through the transmissions to and from the remote service to the printing of the "A" on the user's local terminal display.

Figure 11:
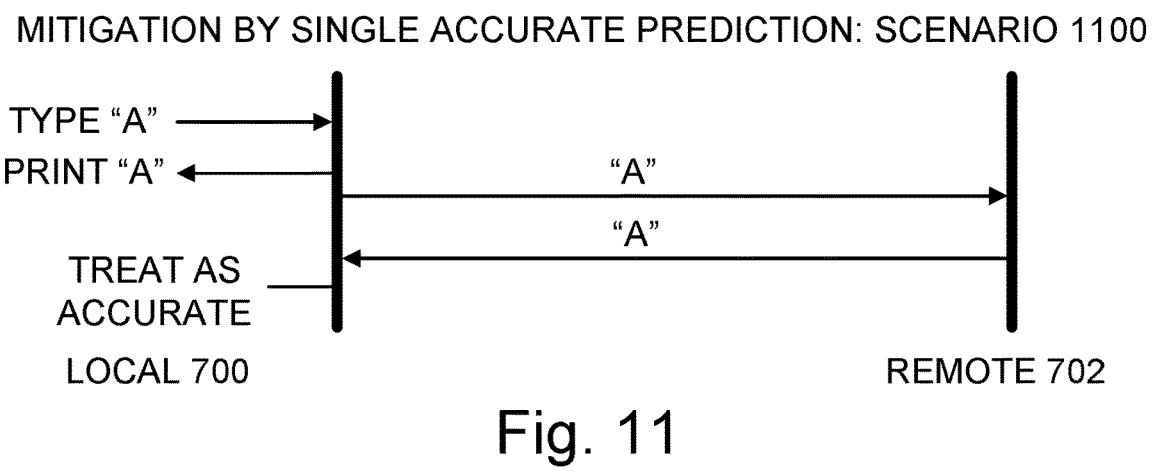
FIG. 11 is a sequence diagram illustrating a scenario that includes successful terminal latency mitigation achieved by way of an accurate prediction.

FIG. 11 illustrates a scenario 1100 that includes successful terminal latency mitigation achieved by way of an accurate prediction. The user types "A". The enhanced terminal 302 obtains "A" as a prediction of the remote service's response, and prints that prediction "A" without making the user wait for the actual response. On or about the same time as the enhanced terminal prints the prediction "A" the enhanced terminal also transmits the input "A" to the remote service. When the remote service eventually responds with an "A", the terminal determines that the prediction was accurate, and treats it accordingly. For instance, the prediction value "A" may have been printed with underlining or some other visual indication 604 that it is a prediction, whereupon treating the prediction as accurate would involve removing the prediction indication 604. This may be done, e.g., by removing the underlining, or by removing an underlined "A" and replacing it with a non-underlined "A".

Figure 12:
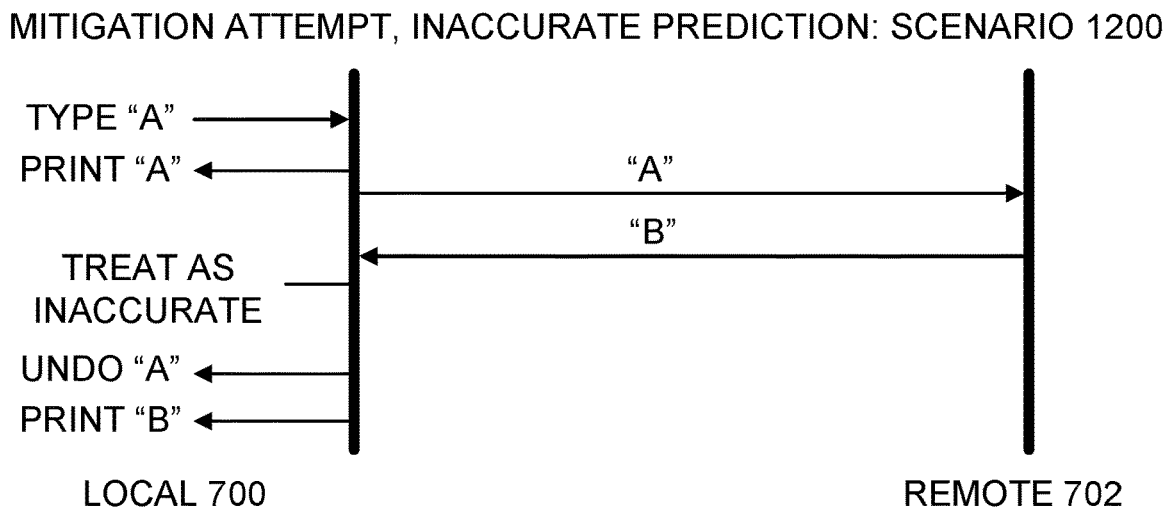
FIG. 12 is a sequence diagram illustrating a scenario that includes an attempted latency mitigation, in which terminal latency mitigation is not achieved due to an inaccurate prediction.

FIG. 12 illustrates a scenario 1200 that includes an attempted latency mitigation, in which terminal latency mitigation is not achieved due to an inaccurate prediction. The typed "A" is sent to the remote service and printed as the prediction, but the service responds with "B", so the prediction is inaccurate. The printed "A" is removed and replaced by the response "B".

Figure 13:
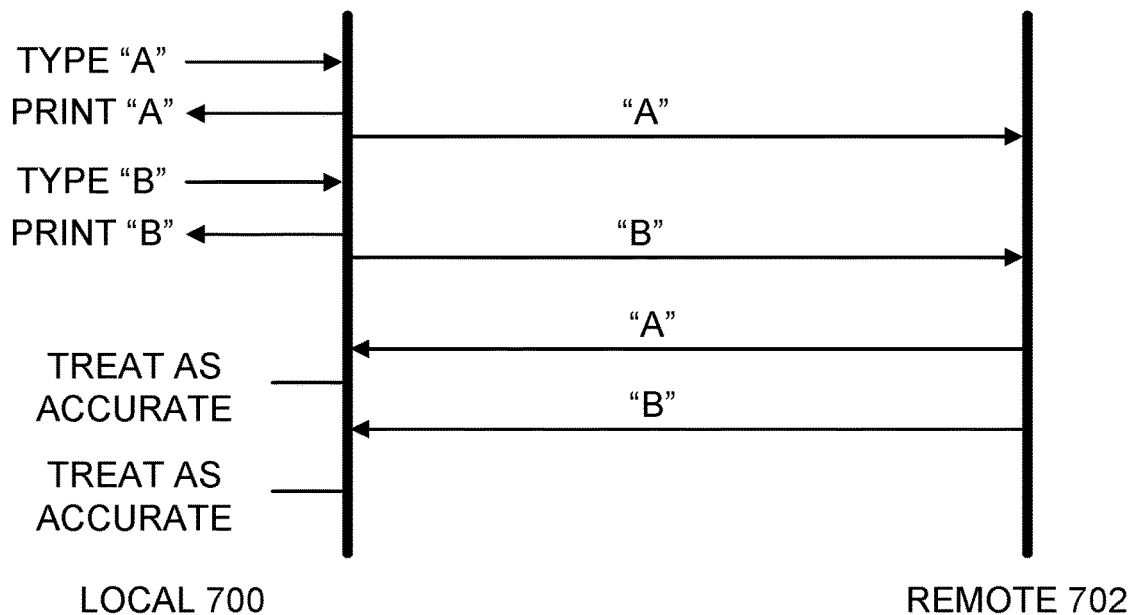
FIG. 13 is a sequence diagram illustrating a scenario that includes successful terminal latency mitigation achieved by way of two consecutive overlapping accurate predictions.

FIG. 13 illustrates a scenario 1300 that includes successful terminal latency mitigation achieved by way of two consecutive overlapping accurate predictions. "A" is typed, printed as a prediction, and sent to the remote service. Then "B" is typed, printed as a prediction, and sent to the remote service. The remote service responds to the "A" with "A", so that prediction is treated as accurate. The remote service responds to the "B" with "B", so that prediction is also treated as accurate. The terminal latency 314 is mitigated by printing the accurate prediction strings "A" and "B" before their matching responses were received at the enhanced terminal 302 from the remote service 210.

Figure 14:
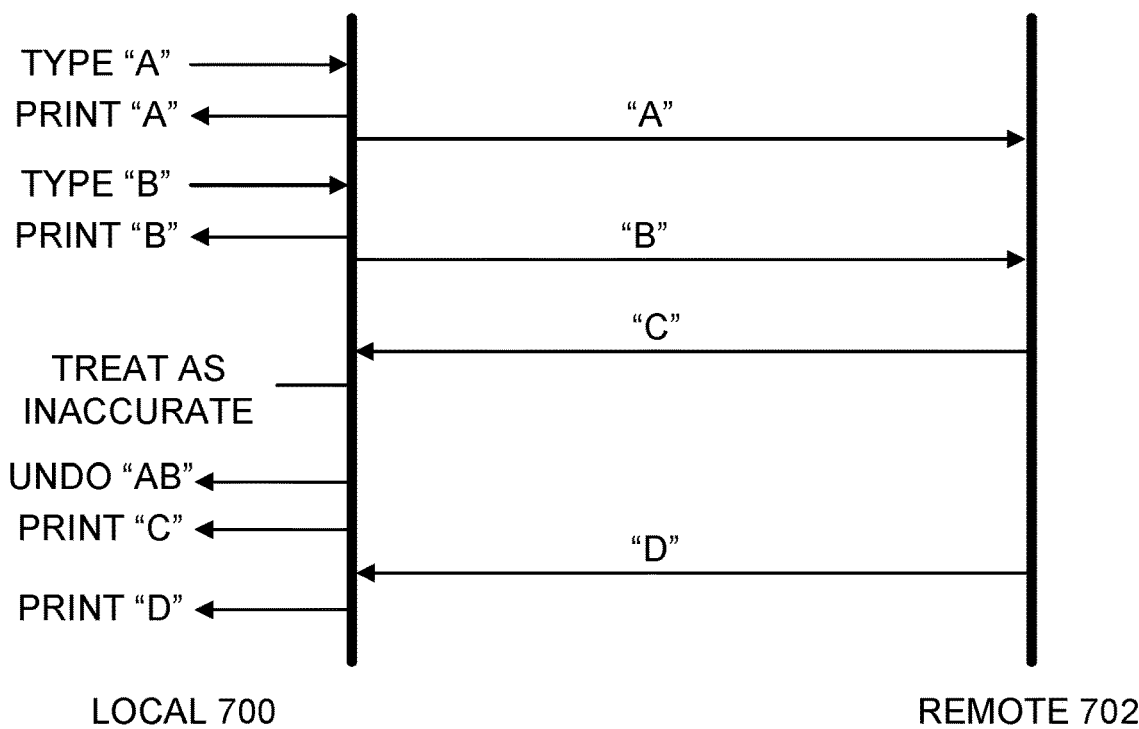
FIG. 14 is a sequence diagram illustrating a scenario that includes an attempted latency mitigation, in which terminal latency mitigation is not achieved due to an inaccurate prediction, and in which the effect of two or more predictions is undone.

FIG. 14 illustrates a scenario 1400 that includes an attempted latency mitigation, in which terminal latency mitigation is not achieved due to an inaccurate prediction, and in which the effect of two or more predictions is undone. Notice that the "B" is undone without separately testing its accuracy. As it happens in this example the "B" is not accurate because the corresponding response was "D". But some embodiments would similarly undo even an accurate response, because it was preceded by an inaccurate prediction ("A" is the predicted response, but "C" is the actual response).

Processes (a.k.a. Methods)

FIG. 15 illustrates a method 1500 which is an example of methods that may be performed or assisted by an enhanced system with terminal latency mitigation functionality, such as system 302. The enhanced terminal receives 1502 key press data from a keyboard local to the enhanced terminal, and transmits 1504 that data toward a remote service. As the transmission 1504 occurs, or shortly thereafter (e.g., within 500 milliseconds) the enhanced terminal locates 1506 a prediction (e.g., in a tree or list of predictions, or using a cache 612, or both) and obtains 1508 a prediction string based on the transmitted 1504 key press data. The enhanced terminal writes 1510 the prediction string to the local display. At some later point, depending on network latency, the enhanced terminal gets 1512 the remote service's response to the transmitted 1504 key press data, and compares 1514 that response to the displayed prediction string. If comparison determines 1516 that the prediction string was accurate (meaning substantively accurate—without regard to any prediction indication formatting) then the enhanced terminal treats 1518 the prediction as accurate, e.g., by removing any prediction indication and by not undoing the substantive (character content) write to the display. But if comparison determines 1516 that the prediction string was not accurate, then the enhanced terminal treats 1520 the prediction as inaccurate, e.g., by undoing the substantive (character content) write to the display. These steps are normally repeated for one or more subsequent key presses.

FIG. 16 further illustrates terminal latency mitigation methods (which may also be referred to as "processes" in the legal sense of that word) that are suitable for use during operation of a system 302 or other system 200 which has a terminal latency mitigation capability 306. FIG. 16 includes some refinements, supplements, or contextual actions for steps shown in FIG. 15. FIG. 16 also incorporates steps shown in FIGS. 11-15. Technical processes shown in the Figures or otherwise disclosed will be performed automatically, e.g., by an enhanced terminal 302, unless otherwise indicated. Processes may also be performed in part automatically and in part manually to the extent action by a human administrator or other human person is implicated, e.g., in some embodiments a human administrator may specify which keys 310 belong to a given prediction class 900. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 15 and 16. Steps may be performed serially, in a partially overlapping manner, or fully in parallel. In particular, the order in which flowchart 1500 action items or flowchart 1600 action items are traversed to indicate the steps performed during a process may vary from one performance of the process to another performance of the process, and print steps 1510 do not necessarily precede transmit steps 1504 as shown in FIGS. 11-14. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method of mitigating latency during operation of a terminal emulator, including the following steps performed by the terminal emulator: receiving 1502 first key press data which identifies a first pressed key; transmitting 1504 the first pressed key data toward a remote service; locating 1506 a first prediction that is associated with the first key press data; obtaining 1508 a first prediction string from the first prediction; writing 1510 the first prediction string to the display; after writing the first prediction string to the display, getting 1512 from the remote service a first response to the first pressed key; determining 1516 that the first prediction string is not an accurate prediction because the first response does not match the first prediction string; modifying the display to replace 1610 the first prediction string based on the first response; receiving 1502 second key press data which identifies a second pressed key; transmitting 1504 the second pressed key data toward the remote service; locating 1506 a second prediction that is associated with the second key press data; obtaining 1508 a second prediction string from the second prediction, the second prediction string having second prediction string character content 714; writing 1510 the second prediction string to the display; after writing the second prediction string to the display, getting 1512 from the remote service a second response to the second pressed key, the second response having second response character content 714; determining 1516 that the second prediction string is an accurate prediction because the second response matches the second prediction string; and avoiding 1620 modifying the display to replace the second prediction string character content 714 based on the second response character content 714; whereby latency is mitigated 1602 by the accurate prediction.

In the foregoing description, the character content 714 of a string is the Unicode or ASCII value, for example, as opposed to the formatting like bold, underline, etc. Also, the "second" accurate prediction could occur before the "first" inaccurate prediction, and other steps can also occur between these two predictions. The terms "first" and "second" are used to denote different events, not to imply an order or to imply any particular differences between the events.

Some embodiments allow or perform selective disabling of predictions, e.g., disabling alpha-numerics, arrow keys, or control-C, based on available heuristics. Heuristics may include information about application 124 input expectations, tool 122 modes, or industry conventions, for example, e.g., conventions about the semantics and permissibility of control key or escape key usage. Which application is currently using the terminal buffer may be determined, e.g., by a system call or examination of a process scheduler data structure or output. Thus, in some embodiments the method further includes disabling 1626 a class 900 of predictions selectively, that is, without disabling all predictions by suspending or terminating terminal emulation. Some embodiments include enabling 1624 a class 900 of predictions selectively, that is, without enabling all predictions by launching or restarting terminal emulation.

Some embodiments infer 1628 an input's size, e.g., by navigating 1630 a prompt left or right or both, based on failed predictions. Knowing such input boundaries 332 may improve the accuracy of predictions for cursor positioning 902 key presses. For example, consider the following line of input:
>>fooba
>>_

In this example, >> indicates a prompt, the input after the first prompt is "fooba" followed by an enter key press, and there is no input yet after the second prompt—the underscore indicates the position of the cursor 322. The enhanced terminal may have predicted an "r" after "fooba" and gotten the carriage return line feed as a response instead of getting "r". Assume the desired result of a control-up-arrow is to position the cursor at the end of the previous line's input. Then the failed prediction of "r" may be noted in the enhanced terminal, along with the length of the "fooba" input, thereby facilitating a correct prediction of cursor position 324 for the control-up-arrow key press. More generally, in some embodiments the method includes inferring 1628 an input boundary 332.

In some embodiments the method includes undoing 1632 respective display modifications of multiple predictions of a sequence of predictions, e.g., when a leading prediction of the sequence is determined to be inaccurate, or when the terminal display is resized. This is illustrated, e.g., in FIG. 14 with a sequence 608 of two predictions, wherein the lead prediction 610, 406 had "A" as its prediction string and the subsequent prediction had "B" as its prediction string. Informally, one may say that the first prediction was "A" and the next prediction was "B". When "A" was determined inaccurate, both "A" and "B" were undone 1632.

In some embodiments the method includes writing 1604 to the display a visual prediction indicator 604 which indicates that the second prediction string is based on a prediction of how the remote service will respond, and then removing 1606 the prediction indicator from the display after determining 1516 that the second prediction string is an accurate prediction. Such prediction indicator removal 1606 may be part of treating 1518 a prediction as accurate.

In some embodiments the method is characterized 502 in that the terminal emulator mitigates 1602 latency of remote service responses to key presses in a single-ended manner by operating entirely locally. FIG. 8 shows one example.

In some embodiments the method is characterized 504 in that the terminal emulator mitigates 1602 latency of remote service responses to key presses when the terminal emulator and the remote service communicate over a network connection, by utilizing 1634 a secure shell protocol 416 both for transmitting 1504 pressed keys data toward the remote service and also for getting 1512 responses from the remote service.

By contrast, some efforts at latency reduction merely bootstrap using SSH or another familiar industry standard protocol and then shut that industry standard protocol down and use instead a proprietary communication protocol. The proprietary protocol may perform, e.g., speculation state synchronization 712 in an architecture like that shown in FIG. 7, in which latency reduction is performed at both the local terminal and the remote server. Such non-standard networking communication protocols are not required by embodiments like those shown, e.g., in FIG. 4 or FIG. 8.

In some embodiments the method is characterized 510 in that the terminal emulator mitigates latency of remote service responses to key presses without reliance on any particular kind of kernel supporting the remote service.

In some embodiments the method is characterized 506 in that the terminal emulator mitigates latency of remote service responses to key presses without creating or storing any of the predictions on a server running the remote service.

In some embodiments the method is characterized 508 in that the terminal emulator mitigates latency of remote service responses to key presses without creating or storing any of the predictions within a shell program.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as prediction data structures 406, prediction queues 408, prediction class 900 definitions, a pressed key cache 612, terminal emulator software 404 with latency mitigating capability 306, and key press data 402, in the form of data 118 and instructions 116, read from a removable storage medium 114 and/or another source such as a network connection, to form a configured storage medium. The configured storage medium 112 is capable of causing a computer system 102 to perform technical process steps for terminal latency mitigation, as disclosed herein. The Figures thus help illustrate configured storage media embodiments and process (a.k.a. method) embodiments, as well as system and process embodiments. In particular, any of the process steps illustrated in FIGS. 11-16, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause one or more devices to perform a terminal emulator latency mitigation method in a terminal emulator. This method includes: receiving 1502 first key press data which identifies a first pressed key; transmitting 1504 the first pressed key data toward the remote service; locating 1506 a first prediction that is associated with the first key press data, obtaining 1508 a first prediction string from the first prediction, and writing 1510 the first prediction string to the display together with a prediction indication that visually indicates the first prediction string is based on a response prediction as opposed to being based on a response from the remote service; after writing the first prediction string to the display, getting 1512 from the remote service a first response to the first pressed key; comparing 1514 the first response to the first prediction string; when the first prediction string is determined 1516 to be an accurate prediction because the first response matches the first prediction string, then modifying 1608 the display to show the first prediction string without the prediction indication; and when the first prediction string is determined 1516 to not be an accurate prediction because the first response does not match the first prediction string, then modifying the display to replace 1610 the first prediction string and the prediction indication by the first response without the prediction indication; and repeating the foregoing steps with additional pressed keys and additional responses, whereby latency of remote service responses to key press data received by the terminal is mitigated 1602 by at least one accurate prediction.

In some embodiments, the method further includes disabling 1626 a class 900 of predictions without disabling all predictions by simply ending or suspending execution of the terminal emulator. The class includes at least one of the following: multiple alpha-numeric characters 910, a key press 902 which changes cursor position and lacks a printable character, a key press 904 which includes a control key, a key press 908 which includes an alt key, a key press 912 which includes a function key, or a key press 906 which includes an escape key. For example, all predictions 900 may be disabled 1626 when running an application such as the *nix "top" command that changes the terminal into a dashboard with CPU information, process information, etc. More generally, predictions may be enabled or disabled based on available contextual information, including without limitation which screen buffer is active and which application is running.

In some embodiments, the method further includes undoing 1632, in a reverse order of writing 1510 prediction strings to the display, respective display modifications of multiple predictions of a sequence of predictions. Multiple predictions may be undone 1632 as a unit to avoid terminal buffer corruption, e.g., when a display area is resized or when a leading prediction of the sequence is determined 1516 to be inaccurate.

In some embodiments, the method is characterized in at least two of the following ways: characterized 502 in that the terminal emulator mitigates latency of remote service responses to key presses in a single-ended manner by operating entirely locally; characterized 504 in that the terminal emulator mitigates latency of remote service responses to key presses when the terminal emulator and the remote service communicate over a network connection utilizing a secure shell protocol for transmitting pressed keys data toward the remote service and for getting responses from the remote service; characterized 510 the terminal emulator mitigates latency of remote service responses to key presses without reliance on any particular kind of kernel supporting the remote service; characterized 506 in that the terminal emulator mitigates latency of remote service responses to key presses without creating or storing any of the predictions on a server running the remote service; or characterized 508 in that the terminal emulator mitigates latency of remote service responses to key presses without creating or storing any of the predictions within a shell program. In some embodiments, the method is characterized in at least three of the listed ways. In some embodiments, the method is characterized in at least four of the listed ways. In some embodiments, the method is characterized in all of the listed ways.

ADDITIONAL EXAMPLES AND OBSERVATIONS

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, secrets or other proofs, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide robust latency mitigation for terminals at the terminal emulator-level. This may be accomplished by providing predictive local echo and local line editing entirely within a terminal process 202 (not a shell 204) when the connection to the remote process 210 has high latency 314. This technical capability combination could be used with tools such as IDEs 334 and cloud shell applications 124, for example. Some embodiments measure latency of responses, and revert a prediction that may not have a response due to timing out. For instance, suppose 'a' is pressed, and an 'a' prediction is printed. If no response is received after a timeout threshold of 2 seconds (as an example threshold value), then an embodiment may undo the printed 'a'. The timeout threshold may be based on an average latency of keystroke responses, e.g., it may be calculated as a multiple: timeout=n*avglatency, where n>1. Some embodiments pause 1644 predictions until the avglatency has passed after an inaccurate prediction, to avoid likely further inaccurate predictions. For instance, in an example with typing 'a', then typing 'b', then receiving 'd', and then typing 'c', the 'c' prediction should not be attempted as the predictions for 'b' and 'c' are likely to be inaccurate. Instead, the embodiment waits for a clean state before beginning predictions again.

An embodiment may define a set of predictions 406 for keystrokes that indicate the key press 402, a prediction string 602 and an undo string 606 indicating what to do when the prediction succeeds or fails. When a key 310 with a prediction 406 is pressed, the embodiment will record the position 324 of the cursor 322 and what was in that cell 420 and then write 1510 immediately a prediction of what will happen to the terminal display 126 (with an optional indicator 604 that this is a prediction) and wait for a response 412. More key presses 402 can happen before the response arrives; they will also be written to the terminal with the prediction, as their own predictions or as local echoes.

Once a response 412 comes back from the remote process 210 one of two things can happen. If the prediction is correct, the predicted character runs a cleanup step 1608 if necessary in order to remove the optional indicator, restoring the cursor back to where it was predicted to be afterwards. The prediction can be discarded 1612, 1518 at this point. If the prediction is wrong, all predicted characters 602 are reverted 1520 using what 606 the prediction defined to do on a failure and the terminal cursor 322 is restored to the position 324 of the first failed predicted character.

Thus, an embodiment may provide a seemingly local terminal experience (that is, one that appears local to a user) for all predictions that are defined. Even when properly defined predictions fail, they will be completely reverted.

In variations, predictions can be improved and refined at runtime. For example, by navigating 1630 an input cursor prompt left or right or both, an embodiment may infer 1628 the size of the input. Thus informed, the embodiment may more reliably guess where the boundaries the cursor can move to are located, even after new input occurs in the middle of prior input.

Another optimization disables 1626 a certain class 900 of predictions the first time it fails (for example alpha-numeric predictions 910). Disabling 1626 and subsequent re-enabling 1624 may leverage information available to the terminal, such as whether the user is operating in the normal buffer 316 or an alt buffer 318, and what application 124 is currently being run (e.g., vim, nano). Only at the point where the prediction would have succeeded is the prediction's class re-enabled 1624. An example of this is entering different modes in the application vim; one would enter insert mode because echoing would work as expected (escape, i), so an embodiment can stop 1626 respecting alpha-numeric predictions 910 until they start succeeding again.

As another variation, commonly occurring keystrokes that the user uses could be recorded in a cache 612; ones that typically lead to the same display change may become a basis of a runtime prediction. For example, if a user presses "a" several times and the response is always to print "bb" then an embodiment could start predicting "bb" as the response to "a". This may be beneficial, e.g., for arrow keys which may move this cursor to the left one space or position the cursor absolutely to the same spot (different sequences, same result).

One of skill will understand that embodiments described herein may have various technical advantages over other approaches. For example, a non-predictive local echo used in some familiar terminals doesn't attempt predictions but merely writes everything immediately to a local display 126. This results in characters printing twice if the remote process 210 sends back the same character.

As another example, predictive functionality may be embedded at a shell 204 level instead of a terminal emulator 202 level. This may have several relative disadvantages. It may be necessary to install predictive code on both the remote server 208 and the client 200, thus preventing server kernel independence 510. The predictive code may also run in the alt buffer 318, such that the terminal's regular scrollback 328 isn't maintained (since the alt buffer has no scrollback). Also, when exiting some applications 124 (e.g., vim), the screen will not be displayed correctly as it's meant to switch back to the normal buffer 316. In addition, predictive code may execute in a process that runs in-between the terminal and whatever shell is on the other side (e.g., bash) which may be undesirable.

In some embodiments, a prediction 406 defines the following for a particular key press 402: what is expected to happen, what the prediction text is and how to undo it. A prediction data structure 406 may include code something like this:

```
interface IPredictionDefinition {
    // The string representing the key that was pressed, for example "a"
    key: string;
    // The string to be printed to the terminal emulator to display the
    // prediction, for example "\x1b[4ma\x1b[0m" (underlined a)
    printedPrediction: string;
    // The expected response needed in order for this prediction to be
    // considered a success, for example "a"
    expectedResponse: string;
}
```

In some embodiments, a predicted keystroke 602 represents an actual predicted keystroke that was displayed to the user. Prediction string 602 may be retained in order to be validated later. Prediction 406 undo string 606 contains information applicable to completely undo and run the cleanup operation. A prediction data structure 406 may include code something like this:

```
interface IPredictedKeystroke {
    // The character(s) that was predicted, for example "a" or "^C"
    char: string;
    // The position of the cursor within the viewport
    cursorPosition: {
        x: number;
        y: number;
        // How many lines from the very top does the viewport begin
        viewportY: number;
```

```
};
// A string calculated at runtime that will completely undo the
operation.
// Note that predicted keystrokes can only be made when undo is
possible
// correct, otherwise it would lead to corruption of the viewport.
undo: string;
}
```

Some embodiments split the undo property into separate properties. Some include a single string 606 to undo, which may be calculated at runtime to include all display effect reversals, e.g., style changes, cursor movement, and so on.

With regard to remembering predicted keystrokes until they are verified 1516, a prediction queue 408 may be used. For example, suppose a user presses "a" and then presses "b" before the initial "a" has been verified. An embodiment may maintain these predicted keystrokes in a_queue_(FIFO) 408 in order to verify them and react at a later time. This may be represented thus: ["a", "b"].

Once a response comes back, the embodiment verifies 1516 whether the predicted keystroke was correct by comparing it to the start of the response. If the response is "a" (correct), the embodiment pops the "a" predicted keystroke off the queue and leaves "b" to be verified later, making the queue: ["b"]. If the response is "c" (incorrect), the embodiment clears 1632 all predicted keystrokes from the queue, as the predicted keystroke is likely incorrect and because it also undoes the "b" predicted keystroke in order to undo the "a" (the "b" predicted keystroke is presumed valid only provided "a" happened). Note that the responses 412 could be batched together and be "ab", in which case the embodiment would verify "a" first as correct and then "b" as correct, leaving an empty queue: [ ].

More complicated examples may also be considered. When a user types in a terminal, text is printed to the screen, which automatically advances the cursor position one cell to the left during an insert (not an append). If the current cell has a character in it the predicted keystroke will have to also move that character to the right. For example if the prompt text (input entered after a prompt) contains "ab", the cursor is on "b" and "c" is pressed, this will result in "acb". For this case, "cb" will be underlined as a prediction and the predicted keystroke data structure for "c" will include information to undo the insert operation if it fails.

Referencing the prediction implementation data structure examples above, a 'IPredictionDefinition.printedPrediction' for this situation would be "c" but it would also shift all the cells to the right and underline them as part of the prediction. This is an example of what could be printed as a result of this: '\x1b[4mcb\x1b[2;2H\x1b[0m' (underline style, print "cb", move cursor to row 2 col 2, clear style)

Here's an example of what this might look like using the 'IPredictedKeystroke' data structure defined above:

```
{
    char: 'c';
    cursorPosition: {
        x: 1;
        y: 2;
        viewportY: 0;
    };
    // Move cursor to row 2 col 1, clear style, print "b" followed by " "
    and
    // move cursor to row 2 col 1
    undo: '\x1b[2;1H\x1b[0mb \x1b[2;1H';
```
```
    // Note that style is cleared here but it could also have a special
    // foreground color or other style that would be included here.
}
```

More generally, if the user is in a prompting input, left arrow should move the cursor back one cell and right arrow should move the cursor forward one cell (wrapping if necessary), so this is defined in the prediction definition. The first time a predicted keystroke for this fails, the embodiment recognizes where the start of the prompt input is located, so it can special case this and do nothing as the prediction definition in this case.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings provided herein may be applied to computing systems 102 in a cloud 206 or elsewhere, and thereby provide terminal latency mitigation enhancements that improve terminal usability. In particular, some embodiments embed latency mitigation functionality 306 within a terminal emulator 202. The latency mitigation functionality reduces perceived and actual delays during use of the terminal emulator as a console 200, by making accurate predictions about the responses 412 a remote service 210 will provide to key press data 402 that is received 1502 by the terminal emulator from a local keyboard 308 and transmitted 1504 to the remote service.

Some latency-mitigated terminal embodiments 302 described herein include or are in operable communication with a display 126, a keyboard 308, a memory 112, and a processor 110. The terminal 302 is also in operable communication over a network 108 with a remote service 210. The terminal processor 110 is configured by terminal emulator software 404 which upon execution by the processor performs terminal emulator latency mitigation steps. These latency mitigation 1602 steps may include receiving 1502 key press data 402 which identifies one or more pressed keys 310, transmitting 1504 the pressed key data toward the remote service 210, and locating 1506 a prediction 406 that is associated with the key press data. The steps may also include obtaining 1508 a prediction string 602 from the prediction, and writing 1510 the prediction string to the display. The prediction string may include one or more characters 312. The prediction string may be written together with a prediction indication 604 that visually indicates the prediction string is based on a response prediction as opposed to being based on an actual response 412 from the remote service.

After writing the prediction string to the display, this example terminal 302 gets 1512 a response 412 to the pressed key from the remote service, and compares 1514 the response to the prediction string. When the prediction string is determined 1516 to be an accurate prediction because the response matches the prediction string, this terminal treats 1518 the prediction as accurate. For example, the terminal may modify 1608 the display to show the prediction string without the prediction indication, if a prediction indication was shown. When the prediction string is determined 1516 to not be an accurate prediction because the response does not match the prediction string, then the terminal treats 1520 the prediction as inaccurate, e.g., by modifying the display to replace 1610 the prediction string and the prediction indication (if any) by the response from the remote service.

This example terminal repeats some or all of the foregoing steps with additional pressed keys and additional responses. As a result, latency 314 of remote service responses to key press data received by the terminal 302 from the user 104 is mitigated 1602 by at least one accurate prediction. Mitigation is evident in that the prediction string is displayed to the user, as if it were the response (or as an explicit prediction thereof), prior to receipt at the terminal of the actual response.

One of skill understands that terminal latency mitigation may improve performance of networked consoles by embedding latency mitigation functionality in a terminal emulator 202. An enhanced terminal 302 reduces perceived and actual delays by accurately predicting responses a remote service will provide to key press data. Latency mitigation 1602 may receive key press data, transmit it toward the remote service, locate a prediction, obtain a prediction string from the prediction, and write the prediction string to a display. A prediction indication may visually indicate the presence of a prediction string as opposed to an actual response from the remote service. After writing the prediction string, this terminal compares the response to the prediction string. When the prediction is accurate the terminal shows the prediction string without any prediction indication. When the prediction is inaccurate, the terminal replaces the prediction string by the response. The enhanced terminal 302 may be server kernel independent 510, shell independent 508, and independent of proprietary communication protocols.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into terminal emulation software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11-16 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A latency-mitigated terminal in operable communication over a network with a remote service, the latency-mitigated terminal having local components comprising:
    a display;
    a keyboard;
    a memory;
    a processor in operable communication with the display, the keyboard, and the memory, the processor configured by terminal emulator software which upon execution by the processor performs terminal emulator latency mitigation steps which include:
    receiving first key press data which identifies a first pressed key;
    transmitting the first pressed key data toward the remote service;
    locating a first prediction that is associated with the first key press data, obtaining a first prediction string from the first prediction, and writing the first prediction string to the display together with a prediction indication that visually indicates the first prediction string is based on a response prediction as opposed to being based on a response from the remote service;
    after writing the first prediction string to the display, getting from the remote service a first response to the first pressed key;
    comparing the first response to the first prediction string;
    when the first prediction string is determined to be an accurate prediction because the first response matches the first prediction string, then modifying the display to show the first prediction string without the prediction indication; and
    when the first prediction string is determined to not be an accurate prediction because the first response does not match the first prediction string, then modifying the display to replace the first prediction string and the prediction indication by the first response without the prediction indication; and
    repeating the foregoing steps with additional pressed keys and additional responses, whereby latency of remote service responses to key press data received by the terminal is mitigated by at least one accurate prediction.

2. The terminal of claim 1, further comprising a prediction queue residing in the memory, the prediction queue configured to hold a prediction sequence designating prediction strings which have been displayed and have not yet been compared with respective responses from the remote service.

3. The terminal of claim 1, wherein the terminal has a normal screen buffer and an alternate screen buffer, the normal screen buffer and the alternate screen buffer have different scrollback functionality from one another, and wherein the terminal emulator software mitigates latency for both buffers in that the terminal emulator software performs the terminal emulator latency mitigation steps with the alternate screen buffer and also performs the terminal emulator latency mitigation steps with the normal screen buffer.

4. The terminal of claim 1, wherein the predictions reside entirely local to the terminal.

5. The terminal of claim 1, wherein a latency mitigating capability and a display writing capability each operate together in a terminal emulation process as opposed to the latency mitigating capability residing in a separate process from the display writing capability.

6. The terminal of claim 1, further comprising a cache of pressed keys and their respective responses.

7. A method of mitigating latency during operation of a terminal emulator, the method comprising the terminal emulator:
    receiving first key press data which identifies a first pressed key;
    transmitting the first pressed key data toward a remote service;

locating a first prediction that is associated with the first key press data;

obtaining a first prediction string from the first prediction;

writing the first prediction string to the display;

after writing the first prediction string to the display, getting from the remote service a first response to the first pressed key;

determining that the first prediction string is not an accurate prediction because the first response does not match the first prediction string;

modifying the display to replace the first prediction string based on the first response;

receiving second key press data which identifies a second pressed key;

transmitting the second pressed key data toward the remote service;

locating a second prediction that is associated with the second key press data;

obtaining a second prediction string from the second prediction, the second prediction string having second prediction string character content;

writing the second prediction string to the display;

after writing the second prediction string to the display, getting from the remote service a second response to the second pressed key, the second response having second response character content;

determining that the second prediction string is an accurate prediction because the second response matches the second prediction string; and avoiding modifying the display to replace the second prediction string character content based on the second response character content;

whereby latency is mitigated by the accurate prediction.

8. The method of claim 7, further comprising disabling or pausing a class of predictions without ending or suspending execution of the terminal emulator.

9. The method of claim 7, further comprising inferring an input boundary.

10. The method of claim 7, further comprising undoing respective display modifications of multiple predictions of a sequence of predictions as a unit.

11. The method of claim 7, further comprising:

writing to the display a prediction indicator which indicates that the second prediction string is based on a prediction of how the remote service will respond; and removing the prediction indicator from the display after determining that the second prediction string is an accurate prediction.

12. The method of claim 7, wherein the method is characterized in that the terminal emulator mitigates latency of remote service responses to key presses in a single-ended manner by operating entirely locally.

13. The method of claim 7, wherein the method is characterized in that the terminal emulator mitigates latency of remote service responses to key presses when the terminal emulator and the remote service communicate over a network connection utilizing a secure shell protocol for transmitting pressed keys data toward the remote service and for getting responses from the remote service.

14. The method of claim 7, wherein the method is characterized in that the terminal emulator mitigates latency of remote service responses to key presses without reliance on any particular kind of kernel supporting the remote service.

15. The method of claim 7, wherein the method is characterized as follows:

the terminal emulator mitigates latency of remote service responses to key presses without creating or storing any of the predictions on a server running the remote service; and the terminal emulator mitigates latency of remote service responses to key presses without creating or storing any of the predictions within a shell program.

16. A computer-readable storage hardware device configured with data and instructions which upon execution by at least one processor cause one or more devices to perform a terminal emulator latency mitigation method in a terminal emulator, the method comprising:

receiving first key press data which identifies a first pressed key;

transmitting the first pressed key data toward the remote service;

locating a first prediction that is associated with the first key press data, obtaining a first prediction string from the first prediction, and writing the first prediction string to the display together with a prediction indication that visually indicates the first prediction string is based on a response prediction as opposed to being based on a response from the remote service;

after writing the first prediction string to the display, getting from the remote service a first response to the first pressed key;

comparing the first response to the first prediction string;

when the first prediction string is determined to be an accurate prediction because the first response matches the first prediction string, then modifying the display to show the first prediction string without the prediction indication; and when the first prediction string is determined to not be an accurate prediction because the first response does not match the first prediction string, then modifying the display to replace the first prediction string and the prediction indication by the first response without the prediction indication; and repeating the foregoing steps with additional pressed keys and additional responses, whereby latency of remote service responses to key press data received by the terminal is mitigated by at least one accurate prediction.

17. The storage hardware device of claim 16, wherein the method further comprises disabling a class of predictions without disabling all predictions, and wherein the class includes at least one of the following: multiple alphanumeric characters, a key press which changes cursor position and lacks a printable character, a key press which includes a control key, a key press which includes an alt key, a key press which includes a function key, or a key press which includes an escape key.

18. The storage hardware device of claim 16, wherein the method further comprises undoing, in a reverse order of writing prediction strings to the display, respective display modifications of multiple predictions of a sequence of predictions when a leading prediction of the sequence is determined to be inaccurate.

19. The storage hardware device of claim 16, wherein the method is characterized in at least two of the following ways:

that the terminal emulator mitigates latency of remote service responses to key presses in a single-ended manner by operating entirely locally;

the terminal emulator mitigates latency of remote service responses to key presses when the terminal emulator and the remote service communicate over a network connection utilizing a secure shell protocol for transmitting pressed keys data toward the remote service and for getting responses from the remote service;

the terminal emulator mitigates latency of remote service responses to key presses without reliance on any particular kind of kernel supporting the remote service;

the terminal emulator mitigates latency of remote service responses to key presses without creating or storing any of the predictions on a server running the remote service; or the terminal emulator mitigates latency of remote service responses to key presses without creating or storing any of the predictions within a shell program.

20. The storage hardware device of claim 19, wherein the method is characterized in at least three of the listed ways.

* * * * *